(No Model.)

R. R. PARSHALL.
HORSE TRAINING APPARATUS.

No. 302,019. Patented July 15, 1884.

WITNESSES:
Donn Twitchell.
C. Sedgwick.

INVENTOR:
R. R. Parshall
BY Munn & Co.
ATTORNEYS.

UNITED STATES PATENT OFFICE.

ROBERT R. PARSHALL, OF WESTFIELD, PENNSYLVANIA.

HORSE-TRAINING APPARATUS.

SPECIFICATION forming part of Letters Patent No. 302,019, dated July 15, 1884.

Application filed April 30, 1884. (No model.)

*To all whom it may concern:*

Be it known that I, ROBERT R. PARSHALL, of Westfield, in the county of Tioga and State of Pennsylvania, have invented a new and Improved Horse-Training Apparatus, of which the following is a full, clear, and exact description.

My invention is designed more especially to prevent trotting-horses from breaking when driven at a high speed.

The invention consists of the special construction and arrangement of the parts of the apparatus, all as hereinafter described and claimed.

Reference is to be had to the accompanying drawings, forming part of this specification, in which similar letters of reference indicate corresponding parts in both of the figures.

Figure 1:
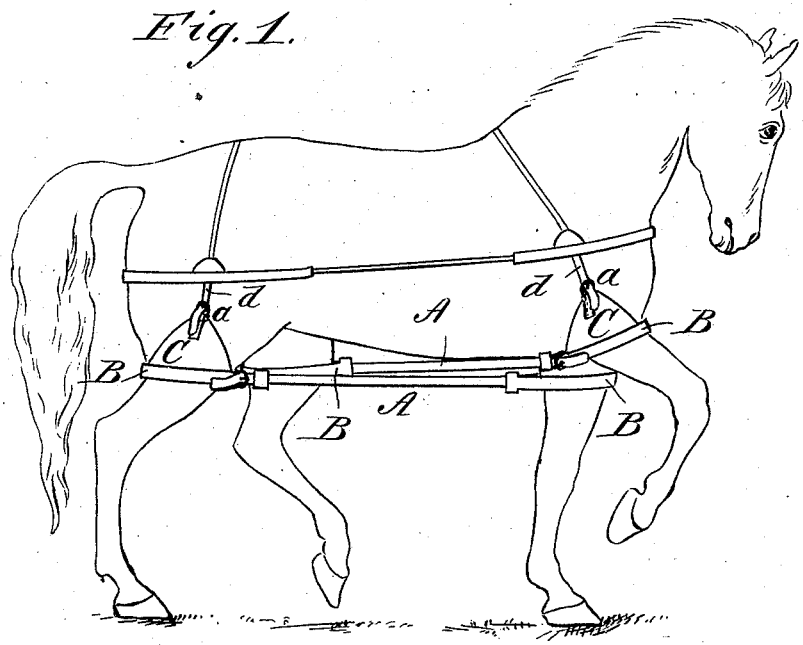
Figure 2:
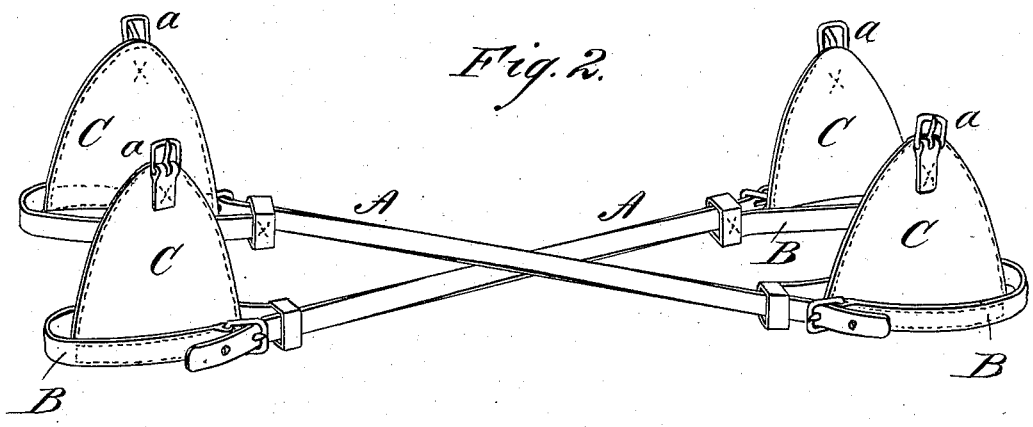

Figure 1 shows my invention as it appears when applied to a horse, and Fig. 2 is a perspective view of the apparatus without the straps for holding it in place upon the horse.

A A represent the straps, to the ends of which the loops B B are attached, which loops are adapted to be placed around the opposite fore and hind legs of the horse, the straps A crossing under the horse, as shown clearly in the drawings. The loops B are by preference provided with the side pieces, C, to come against the outside of the limbs of the horse, and to these side pieces are secured the buckles *a*, to which the short straps *d*, attached to the collar and breeching of the harness, are attached, for holding the loops B in position.

With the apparatus put on as shown—that is, so as to tie opposite front and hind legs together—the horse can walk or trot without the least retraint from the apparatus, but he cannot break these gaits and run or lunge, or take any gait where opposite front and hind legs do not move together.

By applying the device without crossing the straps A—that is, to front and hind legs upon the same side—the horse must rack or pace, so that with this apparatus a horse may be easily trained to take any desired gait except the running or galloping gait.

The apparatus is useful also in breaking young horses, and also upon kicking and runaway horses, as with this apparatus the horse cannot kick or move except in accordance with the arrangement of the apparatus upon his limbs, so that if the horse becomes frightened or vicious he can do no harm.

I am aware that breaking-harness has been heretofore constructed of four bands for the legs of the horse, said bands being connected by straps passing around pulleys in a casing secured to a band passing around the horse. In addition to the belly-bands these attachments have been provided with neckbands and breeching-straps, and not such as that claimed by me, which may be attached to a horse after he is hitched to a vehicle, without having to remove him from the shafts, and without removing the ordinary harness.

Having thus described my invention, what I claim as new, and desire to secure by Letters Patent, is—

A horse-training attachment for harness, consisting of the straps A A, loops B B at opposite ends thereof, side pieces, C C, secured to the loops, and provided with buckles *a* for connecting said side pieces with the ends of the breeching and collar straps of an ordinary harness, substantially as shown and described.

ROBERT R. PARSHALL.

Witnesses:
 A. PARSHALL,
 WILLIAM F. GOODMAN.